(12) United States Patent
Tateno et al.

(10) Patent No.: US 10,031,512 B2
(45) Date of Patent: Jul. 24, 2018

(54) APPARATUS FOR GENERATING AND EDITING NC PROGRAM

(71) Applicant: DMG MORI SEIKI CO., LTD., Nara (JP)

(72) Inventors: Kyoichi Tateno, Sapporo (JP); Hironari Sakamoto, Nara (JP)

(73) Assignee: DMG MORI SEIKI CO., LTD., Nara (JP)

( * ) Notice: Subject to any disclaimer, the term of this patent is extended or adjusted under 35 U.S.C. 154(b) by 322 days.

(21) Appl. No.: 14/627,930

(22) Filed: Feb. 20, 2015

(65) Prior Publication Data
US 2015/0253760 A1 Sep. 10, 2015

(30) Foreign Application Priority Data
Mar. 7, 2014 (JP) .................................. 2014-044715

(51) Int. Cl.
*G05B 19/408* (2006.01)
*G05B 19/4097* (2006.01)
(Continued)

(52) U.S. Cl.
CPC ..... *G05B 19/4083* (2013.01); *G05B 19/4097* (2013.01); *G06F 8/355* (2013.01);
(Continued)

(58) Field of Classification Search
CPC ............ G05B 19/4083; G05B 19/4097; G05B 2219/36043; G05B 2219/31418; G06F 8/355
(Continued)

(56) References Cited

U.S. PATENT DOCUMENTS 4,890,234 A * 12/1989 Tanaka .................. G05B 19/408
318/568.1
4,891,763 A * 1/1990 Kuriyama ........ G05B 19/40931
700/183
(Continued)

FOREIGN PATENT DOCUMENTS

EP 1189123 A2 3/2002
JP 2005-108077 4/2005

OTHER PUBLICATIONS

S. T. Newman, et al., "Strategic advantages of interoperability for global manufacturing using CNC technology", Robotics and Computer-Integrated Manufacturing, Elsevier Science Publishers BV., Barking, GB, vol. 24, No. 6, Dec. 1, 2008, pp. 699-708.
(Continued)

*Primary Examiner* — Christopher E Everett
*Assistant Examiner* — Mohammed Shafayet
(74) *Attorney, Agent, or Firm* — Miller, Matthias & Hull LLP (57) ABSTRACT

An NC program generating and editing apparatus 2 includes an interactive input module 9, a first memory 10, an NC program generator 11, a second memory 12, a program editor 13, a change checker 14 and a data updater 15. The change checker 14 determines whether a changed portion of an edited NC program consists of only a change related to a preset NC code, and when the changed portion consists of only a change related to the NC code, corresponding basic data is updated by the data updater 15.

3 Claims, 6 Drawing Sheets

(51) Int. Cl.
*G06F 9/44* (2018.01)
*G06F 8/35* (2018.01)

(52) U.S. Cl.
CPC .............. *G05B 2219/31418* (2013.01); *G05B 2219/36043* (2013.01)

(58) Field of Classification Search
USPC ............................................. 717/100; 700/83
See application file for complete search history.

(56) References Cited

U.S. PATENT DOCUMENTS

| | | | | |
|---|---|---|---|---|
| 5,552,688 A * | 9/1996 | Haga | .................... | G05B 19/408 318/562 |
| 5,757,649 A * | 5/1998 | Kato | ................. | G05B 19/4097 700/182 |
| 5,974,254 A * | 10/1999 | Hsu | .......................... | G06F 8/71 714/37 |
| 6,107,768 A * | 8/2000 | Ouchi | ................ | G05B 19/4068 318/568.1 |
| 6,266,572 B1 * | 7/2001 | Yamazaki | .......... | G05B 19/4069 700/159 |
| 6,363,298 B1 * | 3/2002 | Shin | ................ | G05B 19/40931 264/510 |
| 6,502,007 B1 * | 12/2002 | Kanamoto | ....... | G05B 19/40937 700/173 |
| 6,658,645 B1 * | 12/2003 | Akuta | ...................... | G06F 8/30 714/25 |
| 6,738,727 B2 * | 5/2004 | Chang | .................. | G06T 7/0004 250/208.1 |
| 7,370,315 B1 * | 5/2008 | Lovell | ..................... | G06F 8/33 715/763 |
| 7,596,468 B2 * | 9/2009 | Chang | .................... | G01B 11/25 345/418 |
| 7,683,900 B2 * | 3/2010 | Chang | .................... | G06T 15/20 345/419 |
| 7,702,417 B2 * | 4/2010 | Ravish | ................. | G05B 19/409 700/182 |
| 7,924,439 B2 * | 4/2011 | Chen | ...................... | G01B 11/24 356/601 |
| 8,255,076 B2 * | 8/2012 | Nasu | .................. | G05B 19/4097 700/182 |
| 8,300,920 B2 * | 10/2012 | Chang | ................... | G01B 11/24 345/419 |
| 8,706,276 B2 * | 4/2014 | Ellis | ........................ | G10L 25/54 700/94 |
| 8,855,407 B2 * | 10/2014 | Chang | .................... | G01B 5/008 382/154 |
| 8,972,040 B2 * | 3/2015 | Kimura | ............ | G05B 19/40932 700/187 |
| 2001/0000805 A1 * | 5/2001 | Kadono | .............. | G05B 19/4097 700/182 |
| 2002/0031019 A1 * | 3/2002 | Nakamura | ......... | G05B 19/4068 365/200 |
| 2002/0082742 A1 * | 6/2002 | Kadono | .............. | G05B 19/4093 700/160 |
| 2003/0204365 A1 * | 10/2003 | Chen | ..................... | G06F 17/243 702/155 |
| 2003/0204366 A1 * | 10/2003 | Chang | ................... | G06T 7/0004 702/167 |
| 2006/0253846 A1 * | 11/2006 | Ogata | ................ | G05B 19/4083 717/151 |
| 2009/0100405 A1 | 4/2009 | Belenky et al. | | |
| 2009/0289953 A1 * | 11/2009 | Chang | .................... | G06T 17/20 345/619 |
| 2010/0021068 A1 * | 1/2010 | Chang | ....................... | G06T 7/12 382/199 |
| 2010/0204818 A1 * | 8/2010 | Yamada | ............ | G05B 19/40938 700/179 |
| 2010/0226540 A1 * | 9/2010 | Chang | .................... | G01B 11/14 382/106 |
| 2010/0272346 A1 * | 10/2010 | Chang | .................... | G01B 11/24 382/141 |
| 2012/0179284 A1 * | 7/2012 | Nakamura | ......... | G05B 19/4068 700/160 |
| 2012/0237113 A1 * | 9/2012 | Chang | .................... | G01B 21/20 382/154 |
| 2013/0103361 A1 * | 4/2013 | Chang | .................... | G06T 19/00 703/1 |
| 2013/0156292 A1 * | 6/2013 | Chang | .................... | G06T 7/001 382/141 |
| 2015/0220078 A1 * | 8/2015 | Stolper | ............. | G05B 19/4097 700/182 |

OTHER PUBLICATIONS

European Search Report for Related Application No. EP15156343; Report dated Jul. 2, 2015.

* cited by examiner

(a) NC program before editing

N20 (FACEMILL)
T4013
G90G54G17G0X245.Y114.
G43Z50.H501S620M3
Z50.M8
G08P1
G1Z0F1000.
Z-45.F420.
G0Z50.
X245.Y58.
G1Z0F1000.
X-45.F420.
G0Z50.
X245.Y0
G1Z0F1000.
X-45.F420.
G0Z50.
G08P0
M9

Hash value B (MD5) =
9523ddf0cac85 43d387d7e194893b6ba

(b) Edited NC program with S code and F code changed

N20 (FACEMILL)
T4013
G90G54G17G0X245.Y114.
G43Z50.H501S500M3
Z50.M8
G08P1
G1Z0F1200.
Z-45.F500.
G0Z50.
X245.Y58.
G1Z0F1200.
X-45.F500.
G0Z50.
X245.Y0
G1Z0F1200.
X-45.F500.
G0Z50.
G08P0
M9

Hash value B (MD5) =
9523ddf0cac85 43d387d7e194893b6ba

(c) Edited NC program with code other than S code and F code changed

N20 (FACEMILL)
T4013
G90G54G17G0X245.Y114.
G43Z50.H501S620M3
Z100.M8
G08P1
G1Z0F1000.
Z-45.F420.
G0Z50.
X245.Y58.
G1Z0F1000.
X-45.F420.
G0Z50.
X245.Y0
G1Z0F1000.
X-45.F420.
G0Z50.
G08P0
M9

Hash Value B (MD5) =
e3dce80eadcdf1f7cce2a6604a794532

APPARATUS FOR GENERATING AND EDITING NC PROGRAM

BACKGROUND

Field of the Disclosure

The present disclosure relates to an NC program generating and editing apparatus that automatically generates an NC program based on basic data for NC program generation, and, when the generated NC program is edited, updates the basic data in accordance with the contents of the editing if the editing is related to only a preset NC code.

Background of the Disclosure

Expert knowledge is necessary for generating an NC program; therefore, a certain skill level is required of a programmer. Hence, there has conventionally been provided, for example, an interactive program generating apparatus attached to a machine tool so that even a machine tool operator can easily generate an NC program.

This interactive program generating apparatus is configured to display, on a display device of an appropriate input and output device, a screen for allowing basic data necessary for generating an NC program, i.e., workpiece shape and dimensions, machining finished shape and dimensions, the contents of machining steps, etc. to be input, a screen for allowing a tool to be selected, and other screens to allow an operator to input necessary basic data in an interactive manner, and automatically generate the NC program based on the input basic data and information stored in a database.

Note that the information stored in the database includes inherent information of the machine tool, information relating to workpiece material and workpiece basic shape, information relating to machined product basic shape, information relating to machining steps such as outer diameter machining, inner diameter machining and grooving, information relating to machining shape, information relating to tool specifications such as tool number and the type, material and dimensions thereof, information relating to cutting conditions depending on workpiece material and tool material, and the like. Further, the basic data input in an interactive manner is generally referred to as CAM data (or interactive data).

Further, as an example of such an interactive program generating apparatus, there has conventionally been known the machining program generation support apparatus disclosed in Japanese Unexamined Patent Application Publication No. 2005-108077 mentioned below.

SUMMARY OF THE DISCLOSURE

Usually, once a new NC program is generated, trial machining is performed using this NC program to check whether there is any error in operation, or whether cutting conditions etc. are suitable, or whether there is any waste in operation. When something is unsuitable or when there is room for improvement, an editing operation, e.g., correction of the NC program, is performed as necessary.

Further, conventionally, in the case where such an editing operation was performed, correspondence relationship between the CAM data and the NC program was considered to be damaged and the CAM data was therefore discarded without exception. This is because the CAM data is data based on which the NC program was generated and a single NC program should be generated unequivocally from the CAM data; therefore, if the NC program is edited, the edited NC program cannot be generated from the CAM data any more.

Figure 5:
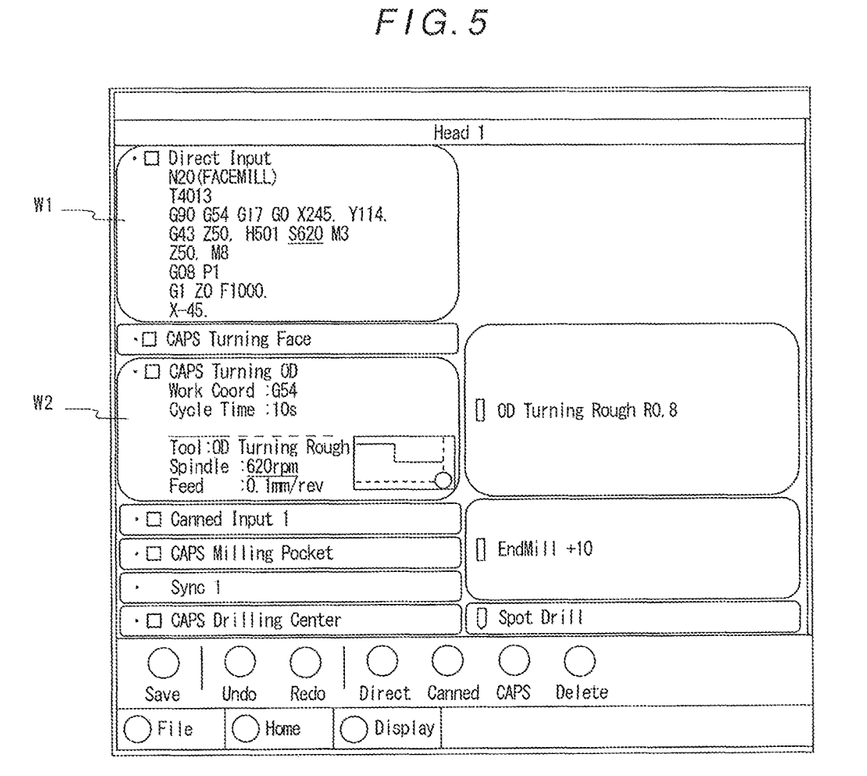
FIG. 5 is an explanatory diagram for explaining an aspect in the present disclosure.

According to the present disclosure, a display mode may be provided in which, in a machine tool having an interactive program generating apparatus as described above, when performing machining using an NC program generated by the interactive program generating apparatus, the NC program under execution is displayed per machining operation, such as rough cutting, finishing and the like, on the display device, and CAM data corresponding to each machining operation is displayed on the display device together with an appropriate graphic. This is because an operator can understand the contents of machining under execution more easily by viewing CAM data and a graphic than by interpreting an NC program consisting of NC codes and numerals. Such a display screen is illustrated in FIG. 5. In FIG. 5, W1 denotes an area in which an NC program is displayed and W2 denotes an area in which CAM data input in an interactive manner and a graphic are displayed.

Figure 6:
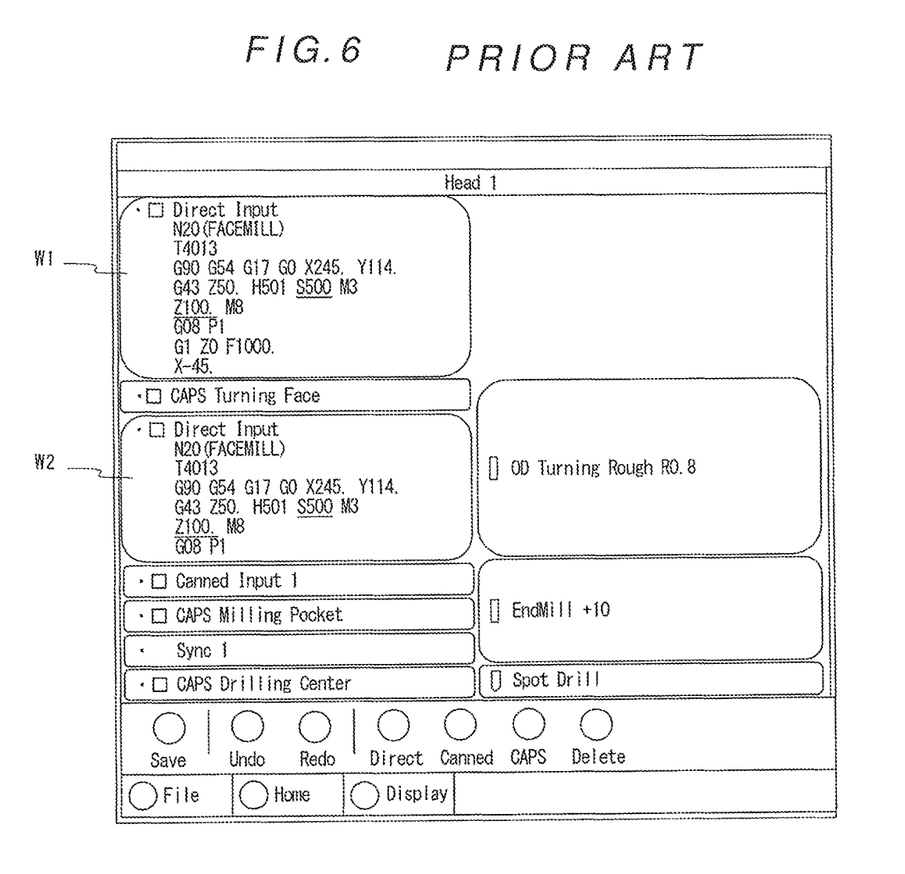
FIG. 6 is an explanatory diagram for explaining the aspect in the present disclosure.

However, if, as mentioned above, the corresponding CAM data is discarded without exception when the NC program is edited, the problem arises that, as illustrated in FIG. 6, after the editing, it is not possible to display the CAM data and a graphic in the area W2 of the display device and an operator therefore can understand the contents of machining only from the NC program. FIG. 6 shows an example in which a spindle rotation number [S620] in the NC program illustrated in FIG. 5 was changed into [S500]. The edited NC program is shown in the area W2.

On the other hand, in editing the NC program, in a case of editing to change data that influences a tool path, such as position data, it is very difficult to change the CAM data corresponding thereto; however, in a case of editing to change a cutting condition, e.g., spindle rotation speed, feed rate or the like, it is easy to change the cutting condition in the CAM data in accordance with the editing.

Therefore, when editing the NC program includes changing a cutting condition or the like such that the CAM data can be easily changed, the corresponding relationship between the NC program and the CAM data after the editing can be maintained by changing the CAM data in accordance with the editing. That is, the edited NC program may be automatically generated unequivocally from the changed CAM data.

Further, changing the CAM data in this way makes it possible to display the edited NC program and the CAM data corresponding to the edited NC program on the display device, which is very useful for an operator.

The present disclosure is provided in view of the above-described circumstances. According to one aspect of the present disclosure, an NC program generating and editing apparatus is provided that is configured to, when an NC program is edited, update basic data in accordance with the contents of the editing if the editing is related to only a preset NC code.

To achieve the above-mentioned aspect, an NC program generating and editing apparatus includes:

a first memory storing therein basic data for automatically generating an NC program;

an NC program generator generating the NC program based on the basic data stored in the first memory;

a second memory storing therein the NC program generated by the NC program generator;

a program editor editing the NC program stored in the second memory;

a change checker determining whether a changed portion of the NC program edited by the program editor consists of only a change related to a preset NC code; and a data updater extracting data related to a changed NC code and updating corresponding basic data stored in the first memory with the extracted data when it is determined by the change checker that the changed portion consists of only a change related to the preset NC code.

According to this NC program generating and editing apparatus, first, basic data for automatically generating an NC program is stored in the first memory. This basic data includes data relating to workpiece shape and dimensions, data relating to machining finished shape and dimensions, data relating to machining steps such as outer diameter machining, inner diameter machining and grooving, and data relating to tool specifications such as tool number and the type, material, and dimensions thereof. The basic data can be input in an interactive manner through a display screen displayed on a display device of an appropriate input and output device, for example; however, the present disclosure is not limited thereto.

Then, the NC program generator automatically generates the NC program based on the basic data stored in the first memory and stores the generated NC program in the second memory. More specifically, the NC program generator has inherent information of a machine tool, information relating to workpiece material and basic shape, information relating to machined product basic shape, information relating to machining steps such as outer diameter machining, inner diameter machining and grooving, information relating to machining shape, information relating to tool specifications such as tool number and the type, material and dimensions thereof, and information relating to cutting conditions depending on workpiece material and tool material, etc., and generates a tool path for each of set steps and sets appropriate cutting conditions for the generated tool paths based on these information and the basic data, and then converts the obtained tool paths and cutting conditions into NC codes by an appropriate processing, thereby generating the NC program.

Then, when the NC program stored in the second memory is changed and edited as appropriate by the program editor, it is determined by the change checker whether the changed portion of the edited NC program consists of only a change related to a preset NC code. When it is determined by the change checker that the changed portion consists of only a change related to the preset NC code, the data updater extracts data related to a changed NC code and updates corresponding basic data stored in the first memory with the extracted data.

Note that, the "preset NC code" is intended to be an arbitrarily set NC code, and more specifically, it means such an NC code that the basic data can be changed. For example, NC codes relating to cutting conditions such as spindle rotation speed, tool rotation speed and tool feed rate, used tool and coolant ON/OFF in the NC program are included in the "preset NC code" because, even when the basic data corresponding to these NC codes are changed, correspondence relationship between the edited NC program and the changed basic data can be maintained. On the other hand, NC codes relating to movement position, e.g., X*, Y*, Z*** and the like, are not included in the "preset NC code" because they are data relating to a tool path and the basic data, therefore, cannot be changed.

Thus, according to this NC program generating and editing apparatus, in a case where an NC program is edited, when change in the NC program consists of a change related to only such an NC code that corresponding basic data can be changed, the basic data corresponding to the changed NC code is updated in accordance with the contents of the editing of the NC program.

Thus, according to this NC program generating and editing apparatus, unlike the conventional art in which basic data is discarded without exception when an NC program is edited, when editing of an NC program consists of only such editing that basic data corresponding thereto can be changed, the basic data is automatically updated in accordance with the contents of the editing of the NC program and the edited NC program and the basic data corresponding thereto can be kept.

Therefore, even when an NC program is edited, this NC program and basic data corresponding thereto can be displayed on an appropriate display device, which allows an operator to grasp the contents of machining from both the displayed NC program and basic data at the time of actual machining.

Further, since the updated basic data is kept, the same NC program as the edited NC program can be generated again based on the kept basic data even if the edited NC program is damaged.

Note that, in the above NC program generating and editing apparatus according to the present disclosure, the program editor may be configured to, in the case where the editing is related to only the preset NC code, incorporate, in the edited NC program, identification data indicating that the editing is related to only the preset NC code or associate the identification data with the edited NC program, and store it in the second memory, and the change checker may be configured to determine, based on the identification data stored in the second memory, whether a changed portion of the edited NC program consists of only a change related to the preset NC code.

When thus configured, by checking whether the identification data is incorporated in the edited NC program or whether the identification data associated with the edited NC program is present in the second memory, the change checker can easily determine whether the editing consists of only a change related to the preset NC code.

Note that, the identification data indicating that only a change related to the preset NC code was made includes not only data directly indicating that but also identification data indirectly indicating that. For example, in a case where identification data A indicating that the NC program was edited regardless of whether the editing is related to the preset NC code or not and identification data B indicating that the editing was performed with respect to an NC code other than the preset NC code are set, when only the identification data A is present, it can be determined that only a change related to the preset NC code was made.

Further, the NC program generating and editing apparatus according to the present disclosure may further include a hash value calculator that calculates, with respect to each of the NC program generated by the NC program generator and the NC program edited by the program editor, a hash value A for the entire program and a hash value B for a portion except for description related to the preset NC code, wherein the change checker is configured to determine, based on the hash values A and B of the NC programs before and after the editing calculated by the hash value calculator, whether a changed portion of the edited NC program consists of only a change related to the preset NC code.

According to this NC program generating and editing apparatus, with respect to each of the NC program generated by the NC program generator and the NC program edited by the program editor, a hash value A for the entire program and a hash value B for a portion except for description related to the preset NC code are calculated by the hash value calculator.

Then, based on the hash values A and B of the NC programs before and after the editing calculated by the hash value calculator, it is determined by the change checker whether a changed portion of the edited NC program consists of a change related to the preset NC code.

Specifically, the hash value A and the hash value B before the editing are compared with the hash value A and the hash value B after the editing, respectively, and when the hash values A are identical, it is determined that there is no change in the contents of the NC program. On the other hand, when the hash values A are not identical, it can be determined that some kind of change was added to the NC program by the editing. Then, in the case where the hash values A are not identical, when the hash values B are identical, it can be determined that only a change related to the preset NC code was made, while when the hash values B are not identical, it can be determined that editing including a change of a code other than the preset NC code was performed. In this way, the change checker determines whether a changed portion of the edited NC program consists of only a change related to the preset NC code.

Thus, also according to this NC program generating and editing apparatus, it can be easily determined whether the editing consists of only a change related to the preset NC code.

Note that, the hash value in the present disclosure means data obtained by processing a text portion of the NC program using a hash function.

As described above, according to the NC program generating and editing apparatus according to the present disclosure, unlike the conventional art in which basic data is discarded without exception when an NC program is edited, in a case where editing of an NC program consists of only such editing that basic data corresponding thereto can be changed, the basic data is automatically updated in accordance with the contents of the editing of the NC program and the edited NC program and the basic data corresponding thereto can be kept.

Therefore, even when an NC program is edited, this NC program and basic data corresponding thereto can be displayed on an appropriate display device, which allows an operator to grasp the contents of machining from both the displayed NC program and basic data at the time of actual machining.

With a configuration in which the determination whether only a change related to a preset NC code was made or not is made based on identification data or a hash value, the determination can be easily made.

BRIEF DESCRIPTION OF THE DRAWINGS

For a more complete understanding of the disclosed methods and apparatus, reference should be made to the embodiment illustrated in greater detail on the accompanying drawings, wherein.

DETAILED DESCRIPTION

Hereinafter, specific embodiments of the present disclosure will be described based on the accompanying drawings.

Figure 1:
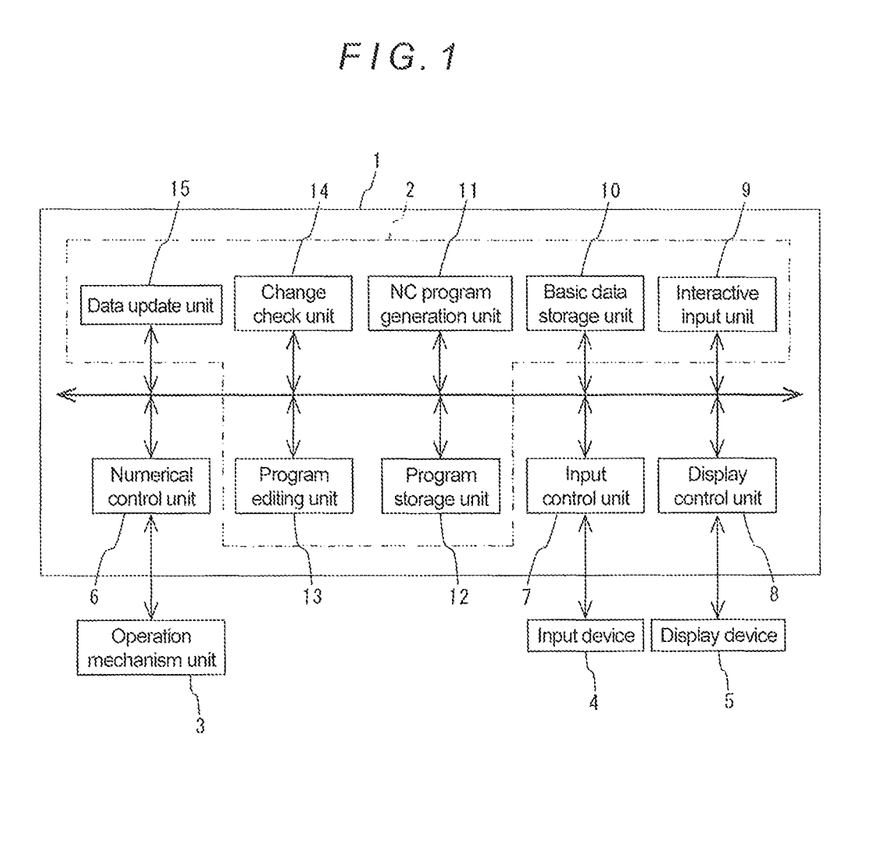
FIG. 1 is a block diagram illustrating a schematic configuration of an NC program generating and editing apparatus according to a first embodiment of the present disclosure.

First, a first embodiment of the present disclosure is described. FIG. 1 is a block diagram illustrating a schematic configuration of an NC program generating and editing apparatus according to the first embodiment of the present disclosure.

As illustrated in FIG. 1, an NC program generating and editing apparatus 2 of the present embodiment is configured to be incorporated in a numerical controller 1 of an appropriate NC machine tool and includes an interactive input module 9, a first memory 10, an NC program generator 11, a second memory 12, a program editor 13, a change checker 14 and a data updater 15.

Note that, the numerical controller 1 includes, in addition to the NC program generating and editing apparatus 2, a numerical controller 6 that numerically controls an operation mechanism module 3 of the NC machine tool, and an input controller 7 and a display controller 8 that respectively control an input device 4 and a display device 5 which are arranged in an operation panel. The display device 5 has a display for displaying a screen, etc., and the input device 4 has a keyboard, softkeys, etc.

The interactive input module 9 performs a processing of displaying, on the display device 5, a screen for allowing basic data (this is generally referred to as CAM data) necessary for generating an NC program, i.e., workpiece shape and dimensions, machining finished shape and dimensions, the contents of machining steps and the like, to be input, a screen for allowing a tool to be selected, and other screens to cause an operator to input necessary basic data, and storing the input basic data in the first memory 10.

The NC program generator 11 performs a processing of automatically generating the NC program based on the basic data stored in the first memory 10, and storing the generated NC program in the second memory 12 in a state where it is associated with the basic data stored in the first memory 10. Specifically, the NC program generator 11 has inherent information of the machine tool, information relating to workpiece material and basic shape, information relating to machined product basic shape, information relating to machining steps such as outer diameter machining, inner diameter machining and grooving, information relating to machining shape, information relating to tool specifications such as tool number and the type, material and dimensions thereof, and information relating to cutting conditions depending on workpiece material and tool material, etc., and generates a tool path for each of set steps and sets appropriate cutting conditions for the generated tool paths based on these information and the basic data, and then converts the obtained tool paths and cutting conditions into NC codes by an appropriate processing, thereby generating the NC program. Note that, although the present embodiment has a configuration in which the above information are stored in the NC program generator 11, a configuration in which the information is stored in appropriate storage means other than the NC program generation 11, e.g. a database, may be employed.

The program editor 13 performs a processing of editing the NC program stored in the second memory 12 by an operator's operation through the input device 4 and the display device 5, and performs a processing of storing the edited NC program in the second memory 12. Further, at that time, in the case where the editing consists of only a change related to a preset NC code, the program editor 13 incorporates, in the edited NC program, identification data indicating that the editing consists of only a change related to the preset NC code or associates the identification data with the edited NC program, and stores it in the second memory 12.

Note that the "preset NC code" is intended to be an arbitrarily set NC code, and more specifically, it means such an NC code that the basic data can be changed. For example, NC codes relating to cutting conditions such as spindle rotation speed, tool rotation speed and tool feed rate, used tool and coolant ON/OFF in the NC program are included in the "preset NC code" because, even when the basic data corresponding to them are changed, correspondence relationship between the edited NC program and the changed basic data can be maintained. On the other hand, NC codes relating to movement position, e.g., X*, Y*, Z*** and the like, are not included in the "preset NC code" because they are data relating to a tool path and the basic data therefore cannot be changed.

The change checker 14 performs a processing of determining whether a changed portion of the edited NC program edited by the program editor 13 consist of only a change related to the preset NC code. Specifically, in the case where the identification data is incorporated in the edited NC program by the program editor 13, the edited NC program is analyzed to check whether the identification data is present in the NC program, and only when the identification data is present, it is determined that the editing consists of only a change related to the preset NC code. On the other hand, in the case where the identification data and the edited NC program are stored in the second memory 12 by the program editor 13 in the state where they are associated with each other, it is checked whether the edited NC program and the identification data associated therewith are present, and only when the identification data is present, it is determined that the editing consists of only a change related to the preset NC code. When the NC program is edited by the program editor 13, the change checker 14 determines, in the way as described above, whether the editing consists of only a change related to the preset NC code.

Note that the identification data indicating that only a change related to the preset NC code was made includes not only data directly indicating that but also identification data indirectly indicating that. For example, if identification data A indicating that the NC program was edited regardless of whether the editing is related to the preset NC code or not and identification data B indicating that editing was performed with respect to an NC code other than the preset NC code are set, when only the identification data A is present, it can be determined that only a change related to the preset NC code was made.

When the editing consists of only a change related to the preset NC code as a result of the determination made by the change checker 14, the data updater 15 performs a processing of comparing the NC programs before and after the editing and extracting data related to a changed NC code, and updating corresponding basic data stored in the first memory 10 with the extracted data. Note that, the data updater 15 may be configured to, when the editing does not consist of only a change related to the preset NC code, cancel the association between the NC program and the basic data corresponding thereto stored in the first memory 10 or delete the basic data from the first memory 10.

According to the NC program generating and editing apparatus 2 of the present embodiment having the above-described configuration, first, basic data necessary for generating an NC program is input by an operator's operation through the interactive input module 9, and the input basic data is stored in the first memory 10.

Subsequently, the NC program is automatically generated by the NC program generator 11 based on the basic data stored in the first memory 10, and the generated NC program is stored in the second memory 12 in a state of being associated with the basic data.

Then, when the NC program stored in the second memory 12 is changed and edited as appropriate by the program editor 13, it is determined by the change checker 14 whether the changed portion of the edited NC program consists of only a change related to a preset NC code. When it is determined by the change checker 14 that the changed portion consists of only a change related to the preset NC code, the data updater 15 extracts data related to the changed NC code by comparing the NC programs before and after the editing, and updates corresponding basic data stored in the first memory 10 with the extracted data.

Thus, according to this NC program generating and editing apparatus 2 of the present embodiment, unlike the conventional art in which basic data is discarded without exception when an NC program is edited, when editing of an NC program consists of only such editing that basic data corresponding thereto can be changed, the basic data is automatically updated in accordance with the contents of the editing of the NC program and the edited NC program and the basic data corresponding thereto can be kept.

Therefore, even when an NC program is edited, this NC program and basic data corresponding thereto can be displayed on an appropriate display device; therefore, an operator can grasp the contents of machining from both the displayed NC program and basic data at the time of actual machining.

Figure 2:
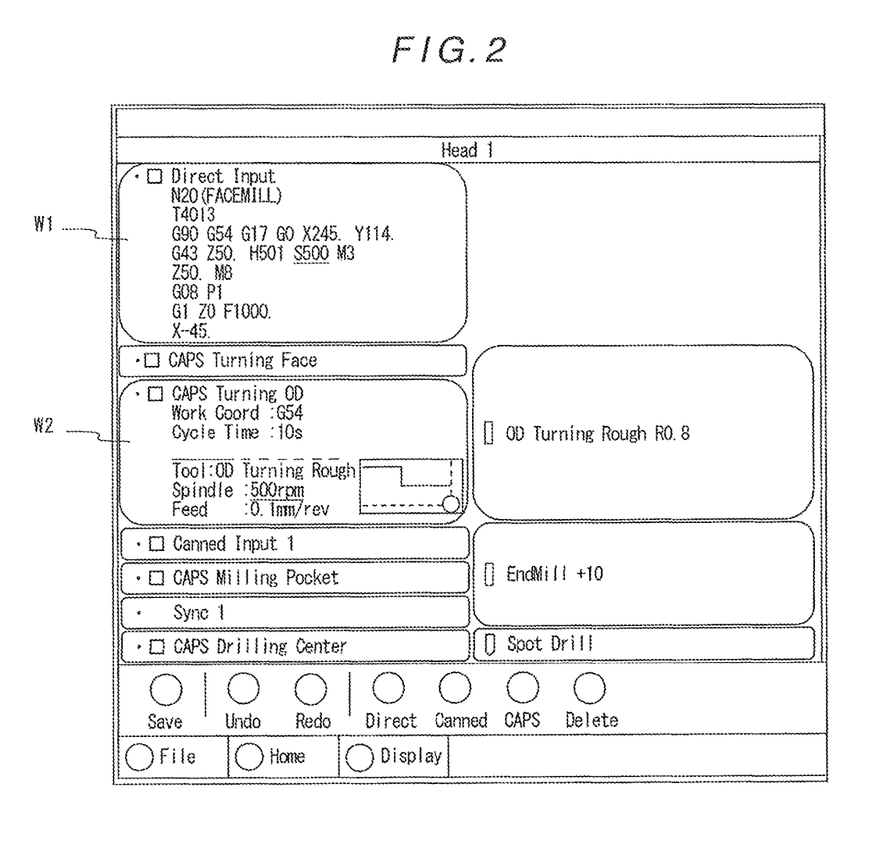
FIG. 2 is an explanatory diagram illustrating a display screen of a display device according to the first embodiment.

In FIG. 2 a display screen displayed on the display device 5 when a spindle rotation number [S620] in the NC program illustrated in FIG. 5 is changed into [S500] is illustrated. An area W2 is an area in which the basic data and a graphic are displayed, and the spindle rotation number [500 rpm] which are the basic data updated in accordance with the change of the NC program is displayed in this area W2. An operator can grasp the contents of machining through such a display screen relating to the basic data which is displayed in the area W2.

Further, since the updated basic data is kept in the first memory 10, even if the edited NC program is accidentally deleted from the second memory 12, the same NC program as the edited NC program can be generated again based on the basic data kept in the first memory 10 by the NC program generator 11.

Further, since the determination whether a changed portion of the edited NC program consists of only a change related to the preset NC code is made based on the identification data, the determination processing can be easily performed.

Note that although the present embodiment has a configuration in which the NC program generating and editing apparatus 2 is incorporated in the numerical controller 1, the present disclosure is not limited to this configuration, and the NC program generating and editing apparatus 2 and the numerical controller 1 may be configured separately and connected to each other. Further, the editing apparatus 2 may be incorporated in a computer placed at a position separated from the NC machine tool, such as an office, and data may be transferred to the numerical controller 1 via wired or wireless communication and a storage medium.

Figure 3:
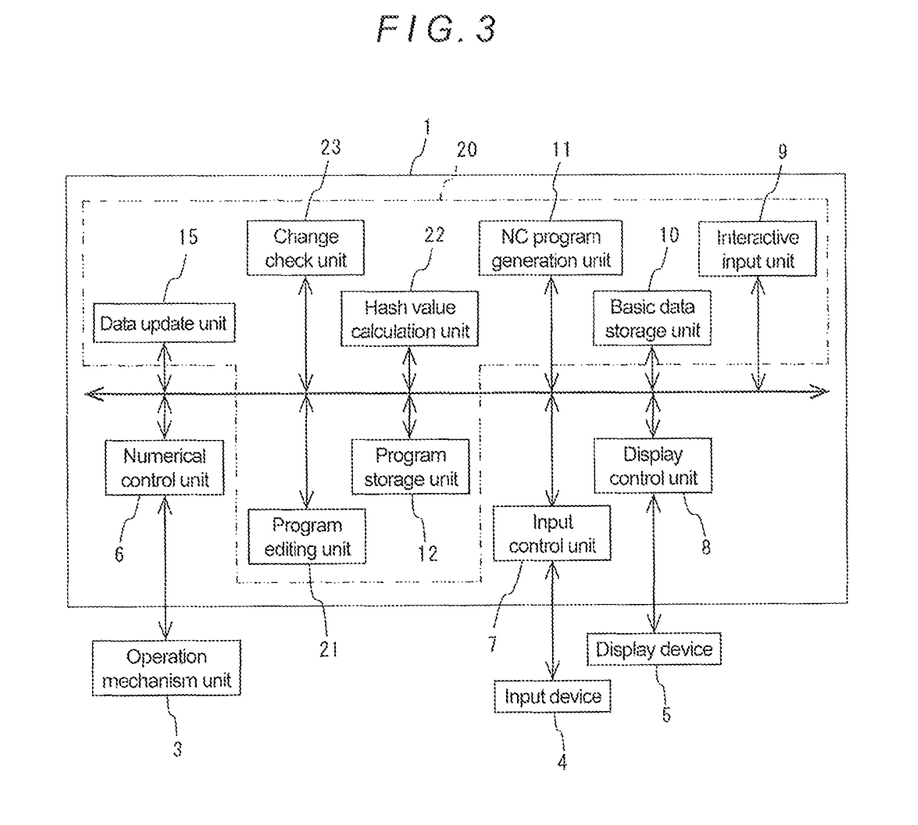
FIG. 3 is a block diagram illustrating a schematic configuration of an NC program generating and editing apparatus according to a second embodiment of the present disclosure.

Next, a second embodiment of the present disclosure is described based on FIG. 3. FIG. 3 is a block diagram illustrating a schematic configuration of an NC program generating and editing apparatus according to the second embodiment of the present disclosure.

As illustrated in FIG. 3, an NC program generating and editing apparatus 20 has a configuration in which: a program editor 21 having processing contents different from those of the program editor 13 of the NC program generating and editing apparatus 2 described above is provided in place thereof; a change checker 23 similarly having processing contents different from those of the change checker 14 is provided in place thereof; and a hash value calculator 22 is newly provided, and other components thereof are the same as those of the NC program generating and editing apparatus 2. Therefore, the same components are denoted by the same reference numerals and detailed descriptions thereof are omitted.

The program editor 21 performs a processing of editing the NC program stored in the second memory 12 by an operator's operation through the input device 4 and the display device 5 and performs a processing of storing the edited NC program in the second memory 12. Note that, the processing contents of the program editor 21 are different from those of the program editor 13 in that the processing relating to the identification data is not performed at the time of the editing processing.

When the editing processing is performed by the program editor 21, the hash value calculator 22 performs a processing of, with respect to the edited NC program edited by the program editor 21 and kept in the program editor 21 or the edited NC program edited by the program editor 21 and stored in the second memory 12 and with respect to the NC program before the editing stored in the second memory 12, calculating a hash value A for the entire program and a hash value B for a portion except for descriptions related to the preset NC code.

Note that, the hash value is data obtained by a processing using a hash function, and the hash value calculator 22 calculates the hash values A and B by processing a text portion of the NC program using the hash function.

Figure 4:
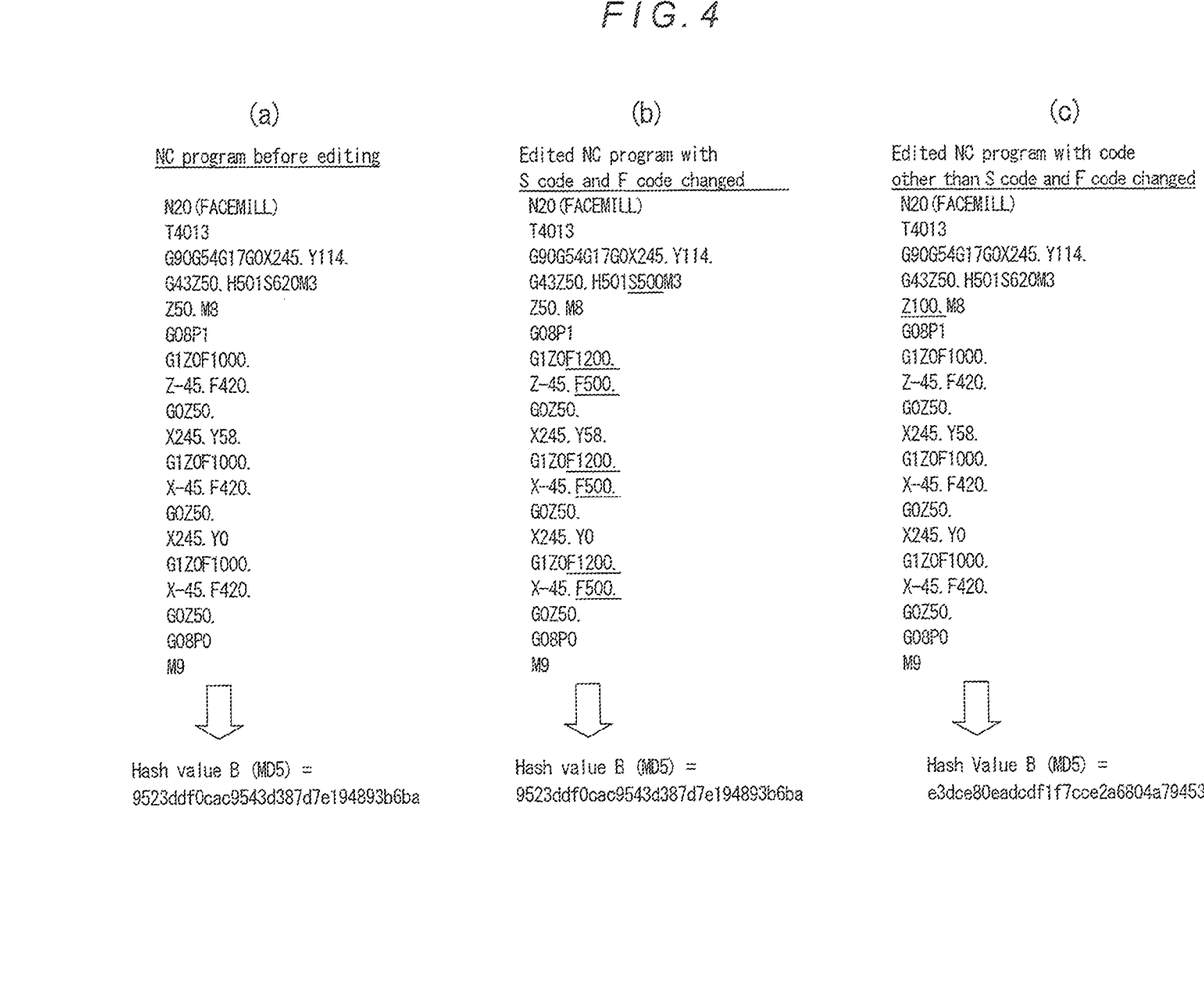
FIG. 4 is an explanatory diagram showing an example of hash value calculation in a hash value calculator of the second embodiment.

An example in which the hash values B are calculated is shown in FIG. 4. (a) shows an NC program example before editing, (b) shows an NC program example in which only S codes relating to spindle rotation speed and F codes relating to tool rest feed rate are changed, and (c) shows an NC program example in which only a Z code relating to tool movement position is changed. The preset NC code in this example is S code and F code. Further, in (b) and (c), the changed portions of the NC programs are underlined.

In this example, the hash value B for the portion except for S codes and F codes in the NC program before editing is "9523ddf0cac9543d387d7e194893b6ba" as shown in (a), the hash value B when only the S codes and the F codes have been changed is "9523ddf0cac9543d387d7e194893b6ba" as shown in (b), and the hash value B when only the Z code, which is a code other than S code and F code, has been changed is "e3dce80eadcdf1f7cce2a6804a794532" as shown in (c).

Note that although there are various methods for calculating a hash value, a method referred to as MD5 is used in the example illustrated in FIG. 4. Further, although the hash values A for the entire NC program sentences before and after editing are not specifically shown, the hash values A are, as a matter of course, different from each other in the case where the NC program is edited.

The change checker 23 performs a processing of determining, based on the hash values A and B of the NC programs before and after the editing calculated by the hash value calculator 22, whether a changed portion of the edited NC program consists of only a change related to the preset NC code.

Specifically, the change checker 23 compares the hash value A and the hash value B before the editing with the hash value A and the hash value B after the editing, respectively. When the hash values A are identical, the change checker 23 determines that there is no change in the contents of the NC program, while when the hash values A are not identical, the change checker 23 determines that some kind of change was added to the NC program by the editing.

Then, in the case where the hash values A are not identical, when the hash values B are identical, the change checker 23 determines that only a change related to the preset NC code was made. That is, this is because the hash value B is a value for the portion except for the descriptions related to the preset NC code, and therefore the fact that the hash values B are identical means that there is no change in the portion except for the preset NC code. As shown in FIG. 4, the hash value B of the NC program before editing (refer to (a)) is the same value as the hash value B of the NC program in which only the S codes and the F codes were changed (refer to (b)), and, on the other hand, is a value different from the hash value B of the NC program in which an NC code other than S code and F code was changed (refer to (c)).

In the way as described above, the change checker 23 determines, based on the hash values A and B of the NC programs before and after the editing, whether a changed portion of the edited NC program consists of only a change related to the preset NC code.

According to the NC program generating and editing apparatus 20 of the present embodiment having the above-described configuration, similarly to the foregoing NC program generating and editing apparatus 2, first, basic data necessary for generating an NC program is input by an operator's operation through the interactive input module 9 and the input basic data is stored in the first memory 10.

Subsequently, the NC program is automatically generated based on the basic data stored in the first memory 10 by the NC program generator 11, and the generated NC program is stored in the second memory 12 in a state of being associated with the basic data.

Then, when the NC program stored in the second memory 12 is changed and edited as appropriate by the program editor 13, a hash value A for the entire program and a hash value B for the portion except for descriptions related to a preset NC code are calculated with respect to each of the NC programs before and after the editing by the hash value calculator 22.

After the hash values A and B are calculated by the hash value calculator 22, based on the calculated hash values A and B, it is determined by the change checker 23 whether the changed portion of the edited NC program consists of only a change related to the preset NC code.

Then, when the result of the determination made by the change checker 23 is that only a change related to the preset NC code was made, by the data updater 15, data related to the changed NC code is extracted by comparing the NC programs before and after the editing and the corresponding basic data stored in the first memory 10 is updated with the extracted data.

Thus, also according to the NC program generating and editing apparatus 20 of the present embodiment, unlike the conventional art in which basic data is discarded without exception when an NC program is edited, in a case where editing of an NC program consists of only such editing that basic data corresponding thereto can be changed, the basic data are automatically updated in accordance with the contents of the editing of the NC program and the edited NC program and the basic data corresponding thereto can be kept.

Therefore, even when an NC program is edited, this NC program and basic data corresponding thereto can be displayed on an appropriate display device, which allows an operator to grasp the contents of machining from both the displayed NC program and basic data at the time of actual machining.

Further, since the updated basic data is kept in the first memory 10, even if the edited NC program is accidentally deleted from the second memory 12, the same NC program as the edited NC program can be generated again based on the basic data kept in the first memory 10 by the NC program generator 11.

Further, since the determination whether the changed portion of the edited NC program consists of only a change related to a preset NC code is made based on the hash values A and B, the determination processing can be easily made.

Note that although the present embodiment also has a configuration in which the NC program generating and editing apparatus 20 is incorporated in the numerical controller 1, the present disclosure is not limited to this configuration, and, similarly to the first embodiment, the NC program generating and editing apparatus 20 and the numerical controller 1 may be configured separately and connected to each other.

Although specific embodiments of the present disclosure have been described above, a mode that can be adopted in the present disclosure is not limited thereto at all.

For example, although the above embodiments are configured to inspect the entire NC program to determine whether there is only a change related to a preset NC code, a configuration may be adopted in which the presence of change is inspected with respect to only specific codes, e.g., major codes such as position codes such as X, Y and Z, M code for coolant ON/OFF, S code for rotation speed, F code for feed rate, G code for rotation command, G code for feed command, etc.

Further, a configuration may be adopted in which the basic data are made of a plurality of data groups which are separated on a machining-step-by-machining-step basis, an NC program for each step is generated from each of the data groups, and these NC programs are integrally combined to generate an NC program. In this case, it is preferable that, when this NC program is edited, the determined whether the editing consists of only a change related to a preset NC code is made with respect to the NC program for each step and the corresponding basic data is updated.

Further, the display screens shown in FIGS. 1 to 6 are merely examples, and it is needless to say that the present disclosure is not limited to them.

What is claimed is:

1. An NC program generating and editing apparatus comprising:
   a first memory configured to store basic data for automatically generating an NC program;
   an NC program generator configured to generate the NC program based on the basic data stored in the first memory;
   a second memory configured to store the NC program generated by the NC program generator in a state where the NC program is associated with the basic data in the first memory;
   a program editor configured to edit the NC program stored in the second memory to obtain an edited NC program and store the edited NC program in the second memory in a state where the edited NC program is associated with the basic data in the first memory;
   a change checker configured to determine whether a changed portion of the edited NC program consists of only a change related to a preset NC code having corresponding changeable basic data; and
   a data updater configured to:
      when it is determined by the change checker that the changed portion of the edited NC program consists of only a change related to the preset NC code, extract data related to the edited NC program and update the basic data stored in the first memory with the extracted data corresponding to the edited NC program; and
      when it is determined by the change checker that the changed portion of the edited NC program does not consist of only a change related to the preset NC code, either:
         cancel storing, in the second memory, of the edited NC program in the state where the edited NC program is associated with the basic data, or
         delete the basic data from the first memory;
   a display configured to display a graphic which shows both the updated basic data and the changed portion of the edited NC program.

2. The NC program generating and editing apparatus of claim 1, wherein:
   the program editor is further configured to, in a case where the changed portion of the edited NC program consists of only a change related to the preset NC code, either:
      incorporate, in the edited NC program, identification data indicating that the changed portion of the edited NC program is related to only the preset NC code, or
      associate the identification data with the edited NC program, and store it in the second memory; and
   the change checker is further configured to determine, based on the identification data stored in the second memory, whether the changed portion of the edited NC program consists of only a change related to the preset NC code.

3. The NC program generating and editing apparatus of claim 1, further comprising a hash value calculator configured to calculate a hash value A for an entirety of the NC program and an entirety of the edited NC program, and calculate a hash value B for a portion of the NC program and a portion of the edited NC program, wherein the portion of the NC program and the portion of the edited NC program exclude descriptions related to the preset NC code, wherein:

the change checker is further configured to determine, based on the hash values A and B, whether the changed portion of the edited NC program consists of only a change related to the preset NC code.

* * * * *